«12» United States Patent
Summer et al.

(10) Patent No.: US 7,228,737 B2
(45) Date of Patent: Jun. 12, 2007

(54) HYDROMETER/FLUID LEVEL SENSOR

(75) Inventors: Mark J. Summer, Frankfort, IL (US); Martin A. Witt, Tinley Park, IL (US)

(73) Assignee: Illinois Tool Works Inc, Glenview, IL (US)

( * ) Notice: Subject to any disclaimer, the term of this patent is extended or adjusted under 35 U.S.C. 154(b) by 155 days.

(21) Appl. No.: 11/103,707

(22) Filed: Apr. 12, 2005

(65) Prior Publication Data
US 2006/0027018 A1   Feb. 9, 2006

Related U.S. Application Data

(60) Provisional application No. 60/599,796, filed on Aug. 6, 2004.

(51) Int. Cl.
*G01N 9/00* (2006.01)
(52) U.S. Cl. ........................................ 73/447
(58) Field of Classification Search ............ 73/444, 73/447; 136/290; 429/91
See application file for complete search history.

(56) References Cited

U.S. PATENT DOCUMENTS

| 3,383,917 | A | | 5/1968 | Ryder et al. | |
|---|---|---|---|---|---|
| 3,417,614 | A | | 12/1968 | Ryder et al. | |
| 3,597,972 | A | | 8/1971 | Ryder | |
| 3,893,339 | A | | 7/1975 | Melone | |
| 3,895,964 | A | * | 7/1975 | Sakamoto | ................. 429/91 |
| 4,074,025 | A | * | 2/1978 | Miyagawa | ................. 429/91 |
| 4,240,282 | A | | 12/1980 | Nelson | |
| 4,308,817 | A | | 1/1982 | Peterson | |
| 5,180,643 | A | | 1/1993 | Nedbal | |
| 6,393,910 | B1 | * | 5/2002 | Korb et al. | ................. 73/447 |

\* cited by examiner

*Primary Examiner*—Hezron Williams
*Assistant Examiner*—John Fitzgerald
(74) *Attorney, Agent, or Firm*—Mark W. Croll; Paul F. Donovan

(57) ABSTRACT

A light transmissive body for a fluid condition indicator has a substantial length shaped as a cruciform in transverse cross-section.

20 Claims, 1 Drawing Sheet

HYDROMETER/FLUID LEVEL SENSOR

CROSS-REFERENCE TO RELATED APPLICATIONS

The present United States Patent Application claims the benefits of U.S. Provisional Application Ser. No. 60/599,796 filed Aug. 6, 2004.

FIELD OF THE INVENTION

I The present invention relates generally to hydrometers and fluid level sensors in storage batteries; and, more particularly, the invention pertains to the light transmissive body between the responsive assembly immersed in the battery fluid and the indicator head along the outer surface of the battery.

BACKGROUND OF THE INVENTION

Battery condition indicators are used in lead/acid storage batteries of many types, including those installed in motor vehicles. Known battery condition indicators function as hydrometers detecting changes in the specific gravity indicative of the electric charge condition of the battery and provide a visual indication of the charge condition. Battery condition indicators also can detect changes in electrolyte level of the battery and provide a visual indication if the electrolyte level is below a predetermined minimum level. It is known to provide both charge condition detection and electrolyte level detection functions in the same battery condition indicator.

A known battery condition indicator is inserted in the cell of a battery and provides a head with a visual window for looking into the indicator. A cage or box is immersed in the fluid electrolyte, if the battery is adequately filled. One or more colored floatable indicator bodies are contained in a channel or channels in the cage and respond to different battery conditions to rise or fall in the channels. A light transmissive rod extends between the head of the indicator and the cage with the floatable bodies. A conical tip at the end of the light transmissive rod has a tip adjacent the channels in which the one or more floatable bodies move. The floatable bodies are of different colors to provide different visual queues when visible through the indicator. A battery condition indicator having one floatable body indicator can provide visual queues for a satisfactorily charged battery with satisfactory electrolyte level, a different visual queue for a satisfactory electrolyte level but a low battery charge and a third queue if the electrolyte level is low. By providing more floatable bodies responsive to different specific gravities, high and low fluid levels can be indicated as well as low, fair and satisfactory electric charge.

Battery condition indicators as described have worked well, but are not without disadvantages. Light transmissive rods used in the indicators have been straight, shaft-like bodies of molded plastic. Rods of small diameter provide a small visual queue of the condition of the battery. The small diameter visual queue can be difficult to perceive accurately, and requires users to understand a color code system of indicated conditions. Rod-shaped transmissive bodies can be damaged during handling, before installation in a battery. A small, hair-line crack that is undetected before installation can propagate over time, causing the indicator to fail in the battery. Injecting plastic into a rod-shaped form can be difficult. If the transmissive body is made of relatively greater diameter, the increased material across the diameter can be slow to cool, increasing cycle times for production. Injection site defects can lead to the problem of crack propagation described above. Straight cylindrical rods can be difficult to align properly in the receiving hole in a battery. Misalignment can result in inadequate sealing in the hole, potentially resulting in fluid loss.

What is needed in the art is a light transmissive body for battery condition indicators that is stronger than known bodies, provides a better visual queue for indicating the status of the battery and is less prone to failure after installation.

SUMMARY OF THE INVENTION

The present invention provides a battery condition indicator with a light transmissive body including a substantial length thereof formed as a cruciate frustum.

In one aspect thereof, the present invention provides an indicator for indicating fluid conditions of a fluid in a container. The indicator has a response assembly indicating changes in response to fluid condition changes; an indicator head through which exhibited changes are visualized; and a light-transmissive body connecting the response assembly and the indicator head. The light transmissive body includes a shaped portion having a cruciform shape in cross-section.

In another aspect thereof, the present invention provides a storage battery electrolyte condition indicator with a response assembly exhibiting visual changes in response to changes in the level of the electrolyte or changes in the specific gravity of the electrolyte. An indicator head is provided, through which exhibited changes are visualized. A light transmissive body is connected between the response assembly and the indicator head. The light transmissive body includes a shaped portion having a cruciform shape in transverse cross-section.

In still another aspect thereof, the present invention provides a light transmissive body for an electrolyte condition indicator with an elongated body of light transmissive material. A conical tip is on the body, and a substantial length of the body has a cruciform shape in transverse cross-section.

An advantage of the present invention is providing a light transmissive body for a battery condition indicator that is stronger than known light transmissive bodies.

Another advantage of the present invention is providing a light transmissive body for a fluid condition indicator that exhibits a more discernable visual queue.

Still another advantage of the present invention is providing a light transmissive body for a better condition indicator which is less prone to failure than known light transmissive bodies.

Other features and advantages of the invention will become apparent to those skilled in the art upon review of the following detailed description, claims and drawings in which like numerals are used to designate like features.

Figure 1:
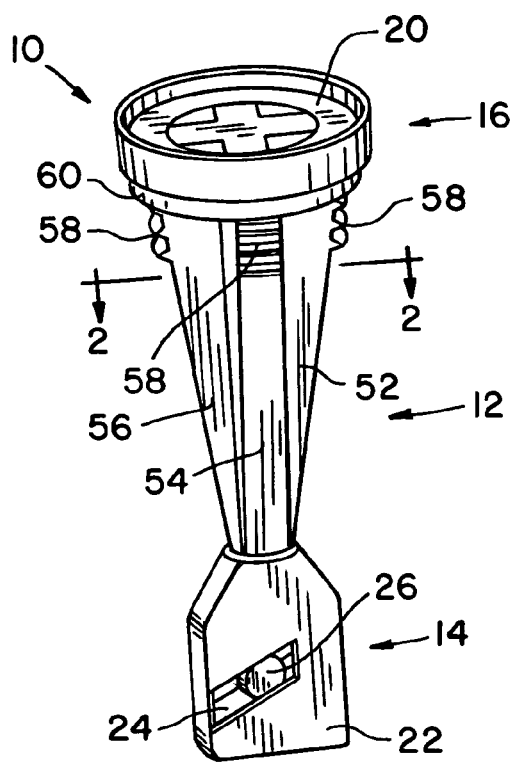
FIG. 1 is a perspective view of a battery condition indicator having a light transmissive body in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a fluid condition indicator, and, more specifically, a battery electrolyte condition indicator having a light transmissive body 12 in accordance with the present invention. Light transmissive body 12 is disposed between a response assembly 14 and an indicator head 16.

Indicators of the type to be described can be used in vessels or containers other than lead/acid storage batteries, although the use in such batteries is a particularly advantageous use thereof. Indicators 10 can be used to detect fluid level changes in a variety of containers or vessels and may also be used to detect changes in other fluid conditions.

Indicator head 16 defines a window 20 for peering into indicator 10. Head 16 can be a single piece of clear plastic or the like, and can be formed as a monolithic body with light transmissive body 12.

Response assembly 14 is connected to light transmissive body 12, and includes a cage or box 22 defining a trough or track 24 containing a floatable body 26. Track 24 has lower and higher portions relative to an end of body 12, allowing floatable body 26 to rise or fall in fluid in which it is immersed, depending on the specific gravity of the fluid. Floatable body 26 also will rise or fall in track 24 with changes in the surface level of the fluid.

Figure 3:
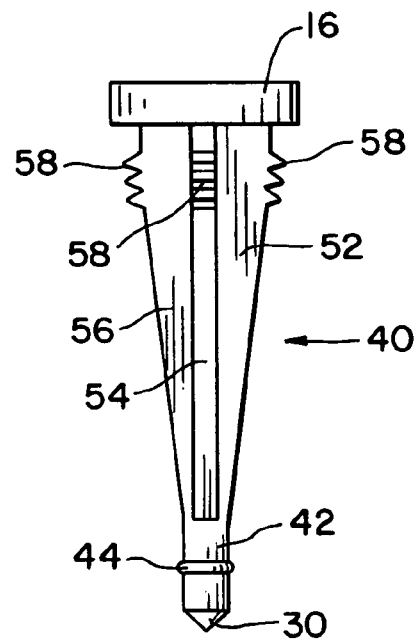
FIG. 3 is an elevational view of the light transmissive body shown in FIG. 1.

Light transmissive body 12, as best seen in FIG. 3, is formed of light-transmitting material such as, for example, acrylic, glass, styrene or other clear, partially clear or tinted materials. Body 12 includes a light reflecting conical tip 30. As known to those skilled in the art, floatable body 26 moves along track 24 in response to changing conditions of a fluid in which it is placed. In response to pre-established changes in specific gravity, floatable body 26 may be adjacent conical tip 30 or distant therefrom. When floatable body 26 is distant from conical tip 30, the color of floatable body 26 is not visible through window 20, indicating that the specific gravity of the fluid in which response assembly 14 is placed has fallen below the pre-established level. If the fluid level is below the level of trough 24, floatable body 26 is again remote from conical tip 30. However, since conical tip 30 is not then submerged in the fluid, the view through window 20 is representative of the reflection of the body 12, in this case, clear, indicating that the fluid level is below the pre-established level. If the fluid level is sufficiently high and the specific gravity is sufficiently great to float floatable body 26 and position floatable body 26 adjacent conical tip 30, the view through window 20 is a bright view of the color of floatable body 26. As those skilled in the art will understand readily, multiple floatable bodies 26 of different colors and responsive to different conditions can be used to indict differing battery conditions. The color of cage 22, the tint of light transmissive body 12 as well as the colors of floatable bodies 26 all influence the image seen through window 20, depending on the fluid level and fluid condition, thereby influencing the locations of floatable bodies 26.

It should be understood that the present invention works equally well with a variety of styles and configurations for response assembly 14. Thus, response assemblies having multiple floatable bodies and trough configurations of different shapes also can be used with the present invention. If indicator 10 is used solely as a fluid level sensor, no floatable bodies 26 are required. If conical tip 30 is submerged, the color of cage 22 and the tint of light transmissive body 12 determine the color of the image visible through window 20. If conical tip 30 is not submerged, the color of the image visible through window 20 is determined only by the tint of light transmissive body 12. Light transmissive body 12 of the present invention can work with any response assembly 14 for which previously known rod-shaped transmissive bodies have been used.

Light transmissive body 12 includes an elongated shaped portion 40 adjacent head 16 and a short cylindrical segment 42 between shaped portion 40 and conical tip 30. A surface configuration 44, such as an annular rib 44 is provided on cylindrical segment 42 for engaging internal structures (not shown) of response assembly 14, for securing response assembly 14 on the end of light transmissive body 12. Other outwardly projecting or inwardly directed surface configurations 44 also can be used, as can other means and methods for attaching response assembly 14 to body 12.

Figure 2:
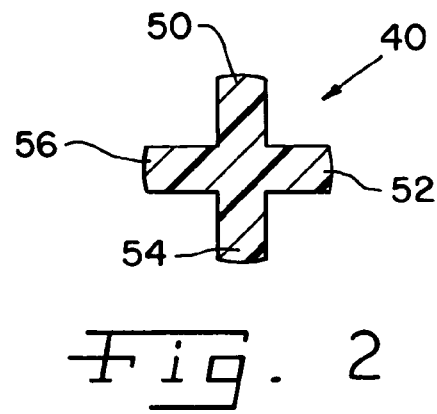
FIG. 2 is a cross-sectional view of the light transmissive body shown in FIG. 1, taken along line 2-2 of FIG. 1.

As seen in FIG. 2, shaped portion 40 has a cruciform shape in transverse cross-section. Shaped portion 40 forms a substantial portion of the overall extent of body 12, and tapers inwardly from head 16 toward cylindrical segment 42. Accordingly, shaped portion 40 is perhaps better described as a cruciate cone and more specifically a cruciate frustum, terminating at the region in which it blends into cylindrical segment 42 and not extending to an apex, as a true cone. Shaped portion 40 thereby defines four elongated triangular wings 50, 52, 54 and 56 extending from head 16 to cylindrical segment 42.

It should be understood that body 12 is a monolithic body including shaped portion 40, cylindrical segment 42 and conical tip 30. Accordingly shaped portion 40 does not terminate in a plane as a true frustum, but blends into cylindrical segment 42, and cylindrical segment 42 blends into conical tip 30. The description of shaped portion 40 as a cruciate frustum is in reference to that portion of body 12 having wings 50, 52, 54, 56, even though not separate from cylindrical body segment 42. Another way of describing that portion of body 12 is a cylinder having right triangle wings 50, 52, 54 and 56 integrally formed therewith within shaped portion 40.

An outer edge portion of each wing 50, 52, 54, 56 includes thread segments 58 near head 16, by which indicator 10 can be secured in an opening of a cell of a battery or the like. Since the outer edges of wings 50, 52, 54, 56 taper inwardly, thread segments 58 also taper and provide a self-centering feature for fluid condition indicator 10 as it is threaded into a receiving opening therefor. The angled lead-in facilitates proper alignment in the receiving hole. Split thread segments 58 turn easily into mating threads of a receiving hole, further facilitating installation. A gasket or seal 60 can be used to provide an effective barrier to the migration of fluid.

As an alternative structure, rather than thread segments 58, wings 50, 52, 54 and 56, or head 16 can be provided with interference features allowing indicator 10 to be pressed into the appropriate opening of a vessel in which it is installed. The tapered design thereof will again facilitate properly aligned installation by providing an angled lead-in for assembly.

Figure 4:
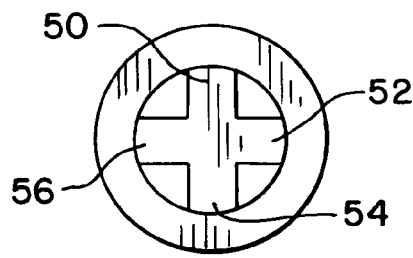
FIG. 4 is a top view of the indicator shown in FIG. 1.
Figure 5:
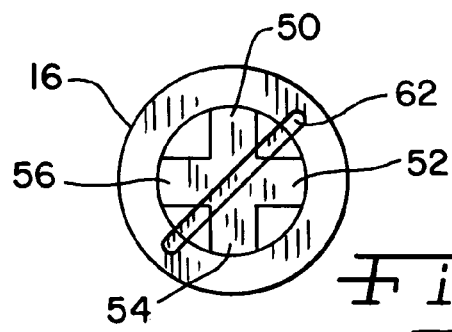
FIG. 5 is a top plan view similar to FIG. 4, but indicating a modified form of the present invention.

As shown in FIG. 4, the cruciform transverse cross-sectional shape of shaped portion 40 appears as a "plus" sign of substantial breadth through window 20. Light transmissive body 12 in accordance with the present invention functions similarly to rod-like transmissive bodies used in previous fluid condition indicators except that, in providing the "plus" shape through window 20, a more readily discernable, recognizable and enlarged image is presented. The expanding configuration of light transmissive body 12 from the lower end thereof near response assembly 14 to the upper end thereof near head 16 broadens and expands the image projected through the body, thereby providing a larger image at window 20 than the diameter of cylindrical segment 42.

The elongated cruciate frustum shape is inherently stronger with less material than a cylinder or rod and is easier to form by injection molding or the like. The shape is such that thickness through body 12 is small, and cooling during molding is faster than for substantially thick rods. Accordingly, cycle times in producing light transmissive bodies 12 in accordance with the present invention is reduced, thereby minimizing cost.

Further, the cruciate shape of light transmissive body 12 provides multiple planes at angles to each other. Accordingly, if a crack or fracture forms in one of the wings 50, 52, 54, 56 the crack will not propagate entirely through light transmissive body 12. Even if one wing 50, 52, 54, 56 does not properly transmit light and becomes non-functioning, the remaining wings 50, 52, 54, 56 will continue to function in that the crack will not propagate from one wing 50, 52, 54, 56 to another wing 50, 52, 54, 56. Thus, at least a partial indication of the condition of the fluid in which response assembly 14 is submerged will continue to be transmitted through light transmissive body 12.

To further aid installation of indicator 10 in a hole for receiving it, a cavity 62 such as a slot for engaging an implement such as a screwdriver, coin or the like can be provided in head 16. Other configurations for head 16 also can be used for receiving a tool or implement to rotate indicator 10 and engage thread segments 58 with mating thread segments of a female threaded opening for indicator 10.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An indicator for indicating fluid conditions of a fluid in a container, said indicator comprising:
    a response assembly indicating changes in response to fluid condition changes;
    an indicator head through which exhibited changes are visualized; and
    a light-transmissive body connecting said response assembly and said indicator head, said light transmissive body including a shaped portion thereof having a cruciform shape in cross-section.

2. The indicator of claim 1, said shaped portion being a cruciate frustum connected to a conical tip.

3. The indicator of claim 2, said cruciate frustum and said conical tip being portions of a monolithic body.

4. The indicator of claim 2, including a cylindrical segment connecting said cruciate frustum and said conical tip.

5. The indicator of claim 4, said cruciate frustum, said cylindrical segment and said conical tip being a monolithic body.

6. The indicator of claim 5, including thread segments in outer surfaces of said cruciate frustum adjacent said head.

7. The indicator of claim 1, including thread segments in outer surfaces of said shaped portion adjacent said head.

8. The indicator of claim 1, said head having a cavity for receiving a drive implement.

9. The indicator of claim 8, said cavity being a slot.

10. A storage battery electrolyte condition indicator comprising:
    a response assembly exhibiting visual changes in response to changes in at least one of a surface level of an electrolyte and specific gravity of the electrolyte;
    an indicator head through which exhibited changes are visualized; and
    a light transmissive body connected between said response assembly and said indicator head, said light transmissive body including a shaped portion have a cruciform shape in transverse cross-section.

11. The condition indicator of claim 10, said shaped portion being a cruciate frustum, and said member having a conical tip.

12. The condition indicator of claim 11, said shaped portion and said conical tip being parts of a monolithic body.

13. The condition indicator of claim 11, said body having a cylindrical segment between said cruciate frustum and said conical tip.

14. The condition indicator of claim 13, said cruciate frustum, said cylindrical segment and said conical tip being a monolithic body.

15. The condition indicator of claim 14, including thread segments in outer surfaces of said cruciate frustum adjacent said head.

16. The condition indicator of claim 10, including thread segments in outer surfaces of said shaped portion adjacent said head.

17. The condition indicator of claim 10, said head configured for receiving a drive implement for rotating said indicator.

18. A light transmissive body for an electrolyte condition indicator, comprising:
    an elongated body of light transmissive material;
    a conical tip on said body; and
    a substantial length of said body having a cruciform shape in transverse cross-section.

19. The light transmissive body of claim 18, including a cylindrical segment between said substantial length of said body and said conical tip.

20. The light transmissive body of claim 18, including thread segments in outer surfaces of said substantial length having a cruciform shape in transverse cross-section.

* * * * *